United States Patent [19]
Koishi et al.

[11] Patent Number: 5,250,795
[45] Date of Patent: Oct. 5, 1993

[54] FEEBLE LIGHT MEASURING DEVICE

[75] Inventors: Musubu Koishi; Motoyuki Watanabe, both of Hamamatsu, Japan

[73] Assignee: Hamamatsu Photonics K.K., Hamamatsu, Japan

[21] Appl. No.: 918,410

[22] Filed: Jul. 24, 1992

[30] Foreign Application Priority Data

Jul. 24, 1991 [JP] Japan ................... 3-184839

[51] Int. Cl.[5] ........................... H01J 40/14
[52] U.S. Cl. ................ 250/214 VT; 313/529
[58] Field of Search ............. 250/214 VT; 313/529, 313/537

[56] References Cited

U.S. PATENT DOCUMENTS 4,988,859 1/1991 Tsuchiya et al. ............. 250/214 VT

*Primary Examiner*—David C. Nelms
*Attorney, Agent, or Firm*—Cushman, Darby & Cushman

[57] ABSTRACT

A feeble light measuring device comprising a photon counting tube, an image detector and a signal processor. The photon counting tube includes a photocathode for generating an electron upon an incidence of light to be measured, an MCP for multiplying the photoelectron from the photocathode and a phosphor screen for converting the photoelectrons multiplied by the MCP into a light image such as luminous spots. The MCP is not saturated by an incidence of single photoelectron. Thus the spread of the luminous spot corresponding to the single photoelectron is very small. The image detector converts the light image from the photon counting tube to electric outputs the signal processor removes noise components of the electric outputs from the image detector to extract signal components of the electric outputs.

17 Claims, 11 Drawing Sheets

FEEBLE LIGHT MEASURING DEVICE

BACKGROUND OF THE INVENTION

1. Field of the Invention

This invention relates to a feeble light measuring device of photon counting type for use in streak camera systems, feeble light imaging devices and so on.

2. Related Background Art

Figure 1:
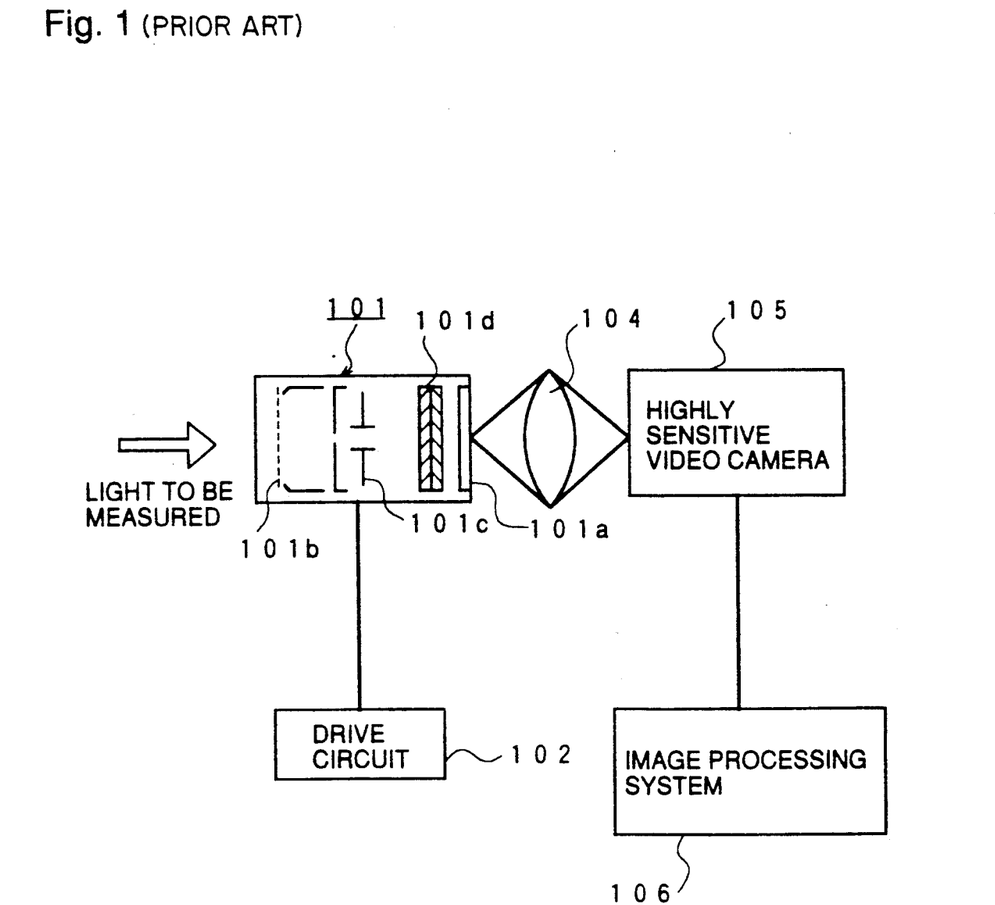
FIG. 1 is a block diagram of the conventional streak camera system.

FIG. 1 shows a block diagram of the conventional photon counting type-streak camera system. This conventional streak camera system comprises a streak tube 101, a driving circuit 102 for driving the streak tube 101, a highly sensitive television camera for detecting a streaking image formed on a phosphor screen 101a of the streak tube 101 through a relay lens 104, and an image processing system 106 for reproducing, storing and processing video signals from the highly sensitive video camera 105. The streak tube 101 comprises an photocathode 101e, an acceleration electrode 101b for accelerating photoelectrons, a deflecting electrode 101c for scanning accelerated photoelectrons, and microchannel plate (MCP) means 101d provided by a pair of MCPs for multiplying the scanned photoelectrons.

Light to be measured is converted into a streaking image by the streak tube 101. The streaking image is converted into video signals by a highly sensitive camera 105. The video signals are A/D converted by the image processing system 106 to be integrated as image data for the improvement of S/N ratios of the signals. The vertical axis of the image data obtained by the image processing system 106 is corresponding to the time axis and the horizontal axis of it is corresponding to the spacial axis on the photocathode 101e. An intensity value of the image data corresponds to a light intensity of the light to be measured. The image processing system 106 generates transient waveforms (time-dependent radiation) of the light to be measured from the image data, and can further display and analyze the transient waveforms.

The conventional streak camera system is disclosed in "High Speed Photography, Videography, and Photonics IV (1986)" SPIE, vol. 693, p. 99, or Japanese Patent Application Unexamined Publication No. 58745/1984.

However, in the conventional streak camera system, the MCP means 101d provided on the streak tube 101 is operated in its saturated state corresponding to the incidence of a single photoelectron, and it is difficult to measure very feeble light events easily with high precision. Specifically, in this case, by superposing two microchannel plates, a single photoelectron is multiplied by about $10^6$ to saturate the MCP means. Consequently due to spread of the multiplied electrons, the sensing precision of an incident position of the photon is degraded. Such resolution decrease can be solved to some extent by giving a barycenter of a spread luminescent spot. But problems with such solution are that the barycenter detection of the luminescent spot needs complicated computation, and takes remarkably much processing time. In addition, it decreases the production yield of the streak tube and increases costs to incorporate two MCPs in the streak tube. When the defect ratio of the streak tube including one MCP is 30%, the defect ratio of the streak tube with two MCPs is as high as 50%. This is also a problem in providing inexpensive streak camera systems. A further problem is that the use of the highly sensitive television camera 106 for taking an image formed by the streak tube makes the system large.

Figure 2:
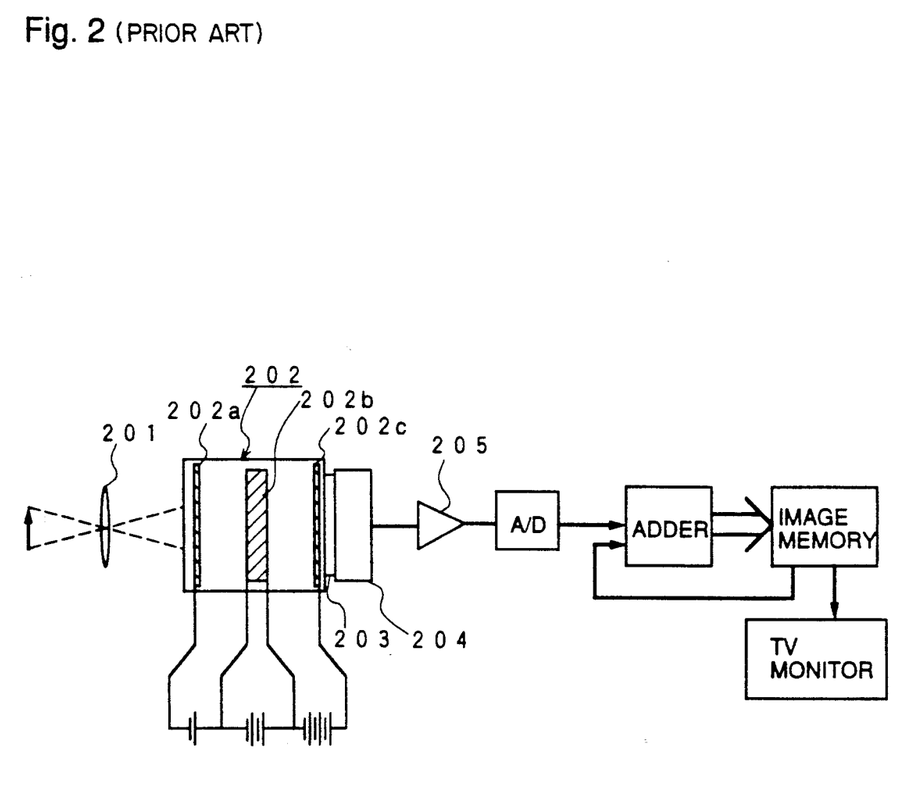
FIG. 2 is a block diagram of the conventional image intensifier system.

FIG. 2 shows a conventional example of the feeble light imaging device using an image intensifier and a CCD camera. An image to be measured is imaged on a photocathode 202a of an image conversion tube 202 by an objective lens 201. Photoelectrons proportional to an intensity of the image are emitted from the photocathode 202a and are incident on an MCP 202b. The photoelectrons incident on the MCP 202b are multiplied by about $10^4$ by an MCP 202b and are incident on a phosphor screen 202c to be converted again into an optical image. An output image of the phosphor surface 202c is led to a fiber plate 203 and is incident on a CCD 204 to be converted into electric signals. Output signals of the CCD 204 are intensified by an image intensifier 205 and A/D converted to be inputted to an adder. The adder reads the image data stored in an image memory up to the immediately preceding operation, and adds the inputted signals thereto. The addition result is stored as new data in the image memory.

The art of repeating such addition operation to thereby improve the S/N ratio of a sensed image is well known, and the simplicity of the art makes it prevalent. In this case, additions increase the signals, but dark current noise of the CCD image sensor, and video read out noises generated by the CCD and Amplifier are also increased by additions. A problem with this art is that the sensing of a feeble light image in a single photoelectron counting region is difficult.

As a method for obtaining an image of a feeble light event in a single photoelectron counting region which cannot be sensed by the above-described feeble light imaging device, a photon counting method is known. The photon counting method multiplies by $10^6$ or more a single photoelectron corresponding to a light event by an electron multiplier comprising a multi-stage MCPs, exactly separating noises generated in an image intensifier and noises generated in reading a CCD from signals indicative of a single photoelectron corresponding to a feeble light event, and detecting only the signal components with high sensitivity.

Figure 3:
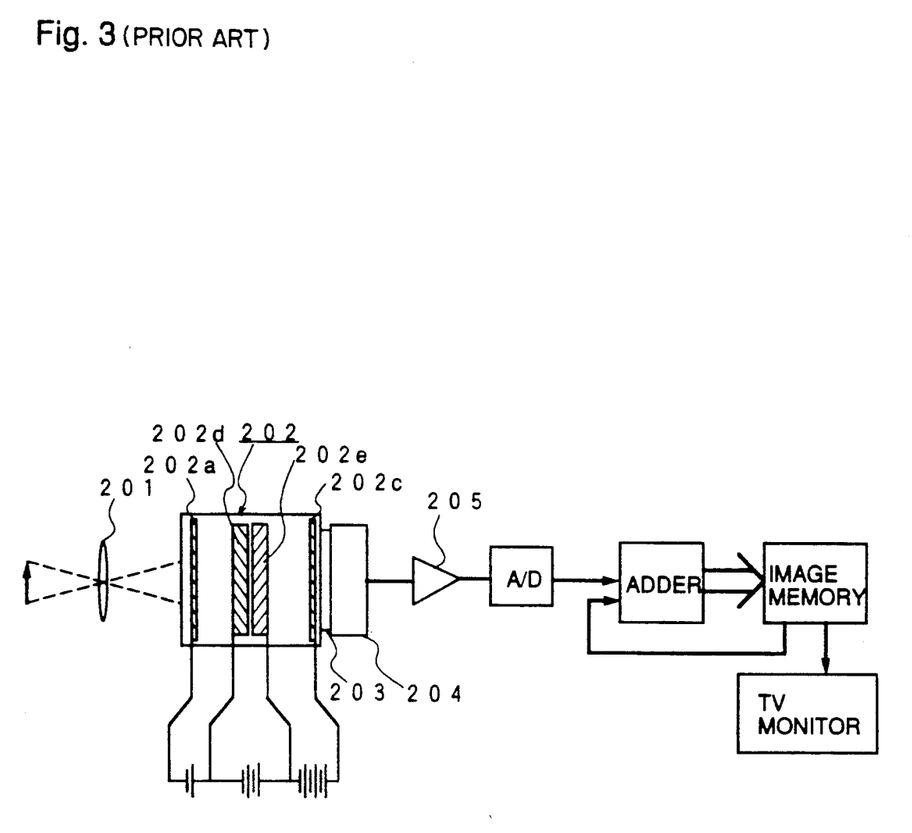
FIG. 3 is a block diagram of the conventional feeble light imaging device.
Figure 4A:
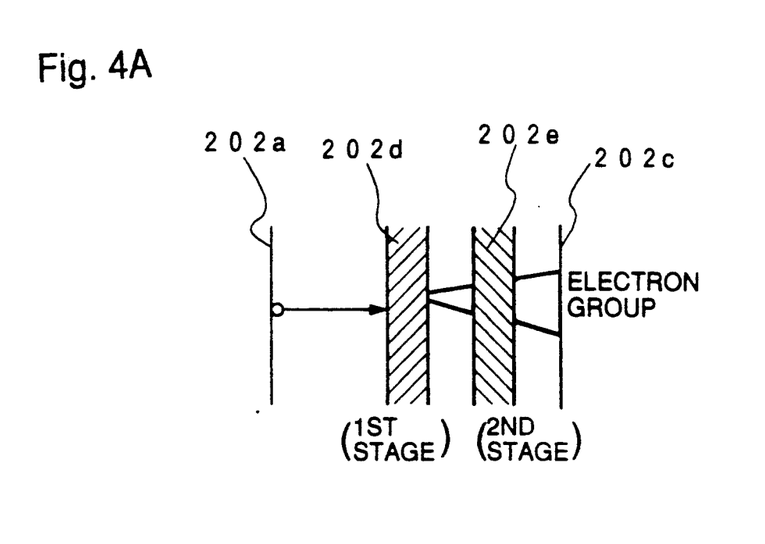
FIG. 4A and 4B are views illustrative of drawbacks of the feeble light imaging device of FIG. 3.
Figure 4B:
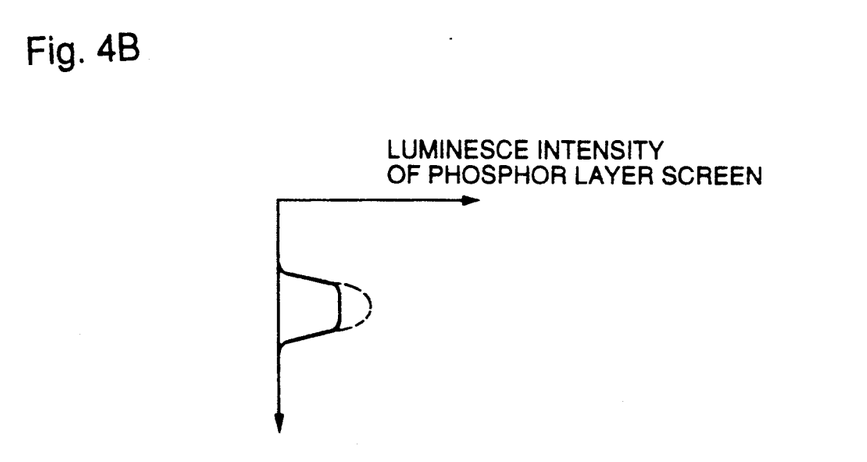

FIG. 3 shows a feeble light imaging device using this photon counting method. The device of FIG. 3 uses an MCP device including a multi-stage MCPs 202d, 202e connected in a cascade for multiplying a single photoelectron by $10^6$ or more. The MCP are connected to each other with a gap therebetween, and output electrons of one channel of the first stage MCP 202d are inputted to a plurality of channels (usually 30 or more) of the second stage and its following MCPs 202e. Consequently the output responding to a single photoelectron on the final stage is a synthesized output of groups of electrons from the plural channels, and its luminescent spot on the phosphor screen 202c is spread. The second and its following MCPs 202e are used in saturating states, therefor MCP 202e operates in ranges having a saturating number of output electrons for any number of input electrons, and accordingly the luminescent spot on the phosphor screen has a blunt luminance distribution. Consequently the resolution is much lowered. FIG. 4 is a view illustrating a luminescent spot generated on the phosphor screen by the multiplication of a single photoelectron. FIG. 4A illustrates the incidence of groups of multiplied electrons on the photocathode 202a. FIG. 4B illustrates a distribution of luminance intensities on the phosphor screen 202c.

To improve such deterioration of the resolution, in the feeble light imaging device of FIG. 3, the barycenter detecting function is provided before the image memory for the computation of a luminescent spot, and the computation result is supplied to the adder and stored in the image memory. In detecting a barycenter, reading noises (noises generated by the CCD and the image intensifying circuit) are completely removed and does not increase during a long period of time of the computation.

This feeble light imaging device of FIG. 3 is a good method for sensing a feeble light image in the single photoelectron region, but has the following problems.

1) The use of a multi-stage MCPs lowers nondefect ratios of the image conversion tube, and costs of the image conversion tube go up. Each MCP includes a bundle of, e.g., 3,000,000 or more glass tubes, which tend to be stuffed or have defects of discharges. A multi-stage MCPs have defect ratios which are deteriorated by a multiple of a number of the MCPs, which results in higher costs.

2) The barycenter center detecting function is necessary. The usual read rate of TV camera is 30 frames per minute and the barycenter center detecting function needs considerably high-speed computing ability. Such function is very expensive.

Figure 5A:
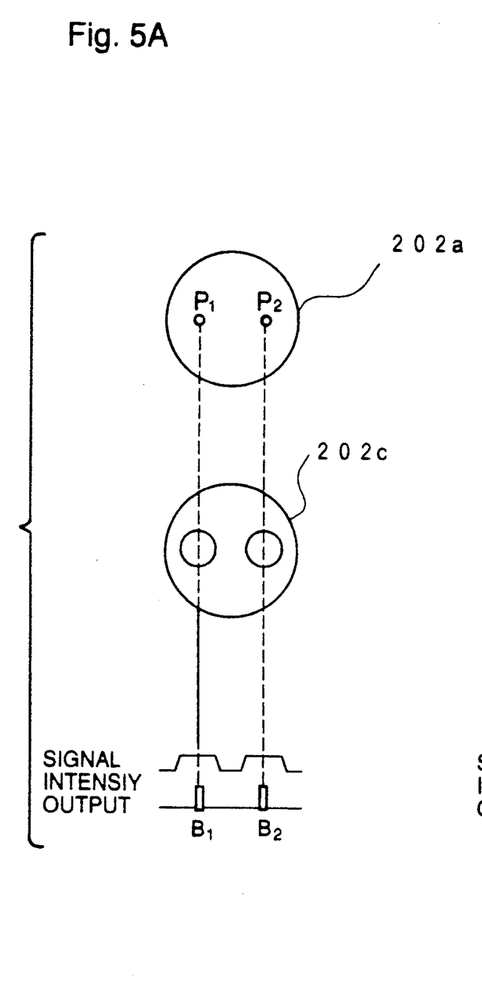
FIG. 5A and 5B are views illustrative of drawbacks of the feeble light imaging device of FIG. 3.
Figure 5B:
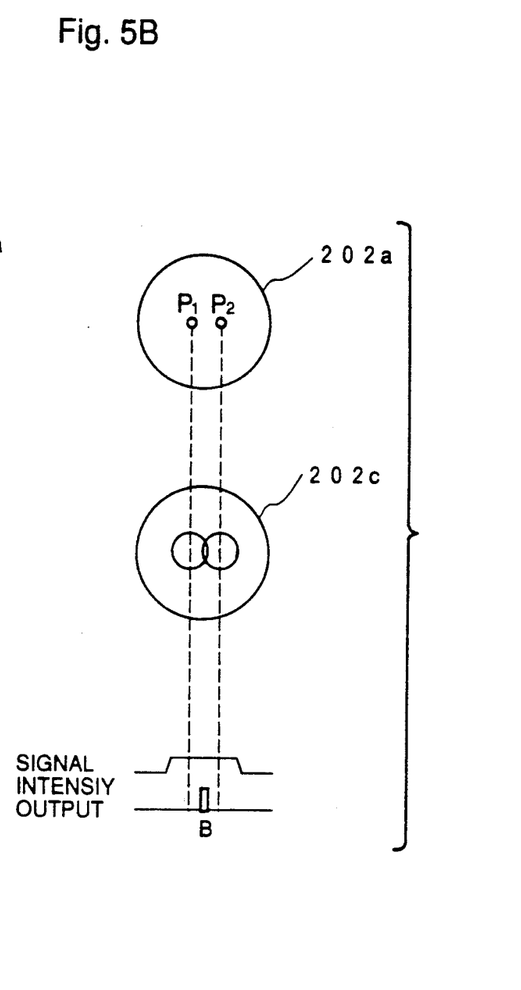

3) An output image of a single photoelectron is so large that counting rate is low, and some cases sufficient resolving power cannot be obtained. For example, when two light points on the photocathode come gradually nearer to each other, the two points cannot separate from each other at a position where the outputs images begin overlapping each other and are adversely sensed as one point. Accordingly in cases of considerably large quantities of light, or partially bright events, the measuring precision is conspicuously deteriorated. FIG. 5 shows views explaining the deterioration of the resolving power. As shown in FIG. 5A, in the case that Points $P_1$ and $P_2$ are sufficiently separated from each other, images formed by a par of photoelectrons incident on Points $P_1$ and $P_2$ does not overlap each other on the phosphor screen 202c, and barycenters $B_1$ and $B_2$ corresponding the events can be independently observed. However, as shown in FIG. 5B, in the case that Points $P_1$ and $P_2$ come nearer to each other, images formed at Points $P_1$ and $P_2$ partially overlap each other both on the phosphor screen and on the photocathode, the result of the barycenter center computation is one point B at the center.

SUMMARY OF THE INVENTION

An object of this invention is to provide a feeble light measuring device of photon counting type which is used in streak camera systems, feeble light imaging devices and so on, and which can solve the above-described problems and can measure feeble light events with high precision.

To solve the above-described problems, the feeble light measuring device according to this invention comprises a) photon counting means including photo-electric conversion means for generating an electron in response to an incidence of light to be measured, electron multiplying means for multiplying the electron from the photo-electric conversion means, the electron multiplying means being not saturated with the incidence of a single electron, and luminous means for converting the electrons multiplied by the electron multiplying means to a light image; b) image detecting means for converting the light image from the photon counting means to electric outputs; and c) signal processing means for removing noise components of the electric outputs from the image detecting means to extract signal components of the electric outputs.

In the feeble light imaging device according to this invention, the electron multiplying means included in the photon counting means is not saturated with the incidence of a single electron corresponding to one optical event. Accordingly an area of the luminous means occupied by incident multiplied electrons is not very large, and the precision of sensing an incident position of one photon corresponding to one optical event can be improved. Furthermore, a light image supplied by the luminous means has a sufficient luminance distribution, and accordingly by the extraction of signal components from the above-described electric outputs, with noise components removed by the signal processing means, an incident position of one photon can be easily identified without detecting a barycenter of the light image.

An incident position of one photon is identified by extracting as the signal components a distribution of parts of the above-described electric outputs above a set level, the binarized data, or a peak positions or others of the parts. When the same event is repeated, one of such signal factors is integrated in a set period of time to extract the signal component.

An incident position of one photon can be identified by storing the extracted signal components in regions corresponding to picture elements of the luminous means in accordance with the timing of electric outputs of the image detecting means.

By providing the electron multiplying means by a single microchannel plate, a higher resolution power can be obtained. In this case, the photon counting means and the image detecting means are coupled to each other by fibers, whereby the drawback of gain shortages due to the photon counting by the single microchannel plate can be effectively eliminated. Consequently the optical coupling efficiency is raised from 0.02 (when use Lens coupling) to 0.3 by more than one place. Accordingly although only one MCP is provided, a signal level of a single photoelectron can be sufficiently higher than a noise level of the image detecting means, and photon counting of high precision can be enabled.

In the case that the photo counting means is a streak tube, the signal processing means can provide transient changes of light intensity to be measured, based on extracted signal components.

In the case that the photon counting means is an image intensifier, the signal processing means can provide an image of a distribution of light intensity to be measured, based on extracted signal components.

A fiber plate may be used to guide to the image detecting means a light image from the luminous means included in the photon counting means.

In cases that a CCD, a photodiode array or other solid image detecting devices is used as the image detecting means, the feeble light measuring device itself can be small-sized, and inexpensive systems can be fabricated.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

Embodiments of this invention will be explained with reference to the drawings attached hereto.

Figure 6:
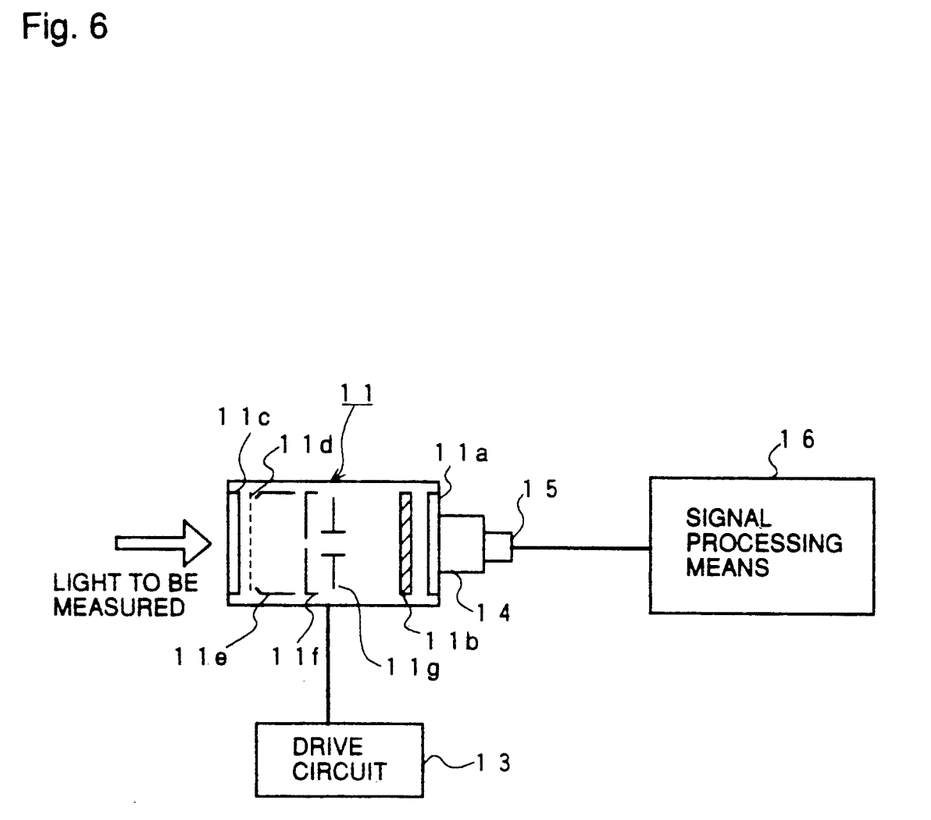
FIG. 6 is a block diagram of the streak camera system according to one embodiment of this invention.

As shown in FIG. 6, the streak camera system comprises a streak tube 11 for forming a streaking image of incident light to be measured, a drive circuit 13 for operating the streak tube 11, a solid state image detector 15 for detecting through a fiber plate 14 a streaking image formed on a phosphor screen 11a of the streak tube 11, and a signal processing means 16 for processing an output video signal from the solid state image detector 15.

The streak tube 11 includes a single MCP 11b for performing non-saturated type electron multiplication. A photoelectron is emitted from photocathode 11c of the streak tube 11 in accordance with an incidence of light to be measured. The emitted photoelectron is accelerated by an acceleration electrode 11d and next enter an aperture of an anode electrode 11f through a focusing electrode 11e. The photoelectron which has passed through the aperture of the anode electrode 11f is deflected at a suitable timing when they pass through deflecting electrode 11g and is incident on the MCP 11b. The incident photoelectron on the MCP 11b is multiplied here, and the multiplied electrons are incident on the phosphor screen 11a and generate a luminous spot on the phosphor screen 11a. The MCP 11b is operative in an unsaturated state upon an incidence of a single photoelectron, and the spread of the luminous spot of the single photoelectron is very small. In place of the above-described streak tube, a combination of a streak tube with no MCP, and an image intensifier with an unsaturated-type MCP may be used.

The fiber plate 14 is made of a bundle of thin optical fibers formed in a plate or a cylinder. The phosphor screen 12 and the solid state imaging device 15 are respectively adhered to the fiber plate 14 with the fiber plate 14 therebetween, whereby a streaking image formed on the phosphor screen 12 is formed on the solid state image device 15 optically efficiently (bright). The fiber plate 14 is one sheet but may be plural laid sheets. The fiber plate 14 may have magnifications, whereby an area of the phosphor screen 12 to be imaged by the solid state image detector 15 can be varied in accordance with a magnification of the fiber plate 14.

The solid image detector 15 can be provided by, e.g., a CCD, a two-dimensional solid state image detector, or a linear photodiode array, or others.

The signal processing means 16 incorporates a memory and others, and can integrate signal components of video signals with noises removed, for respective picture elements corresponding to areas of the phosphor screen 12 to form a time-dependent light waveform.

The operation of this embodiment will be explained. Incident light to be measured is applied to the phosphor screen 11a of the streak tube 11 and is converted into a streaking image. Because the phosphor screen 11a and the solid state image detector 15 are coupled through the fiber plate 14 provided therebetween, the converted streaking image is projected on the solid state image detector 15 through the fiber plate 14. The solid state image detector 15 converts the projected streaking image into video signals and supplies the video signals to the signal processing means 16. The signal processing means 16 removes video noises from the video signals and integrates only the signals of the light to be measured to form a time-dependent light waveform.

Figure 7:
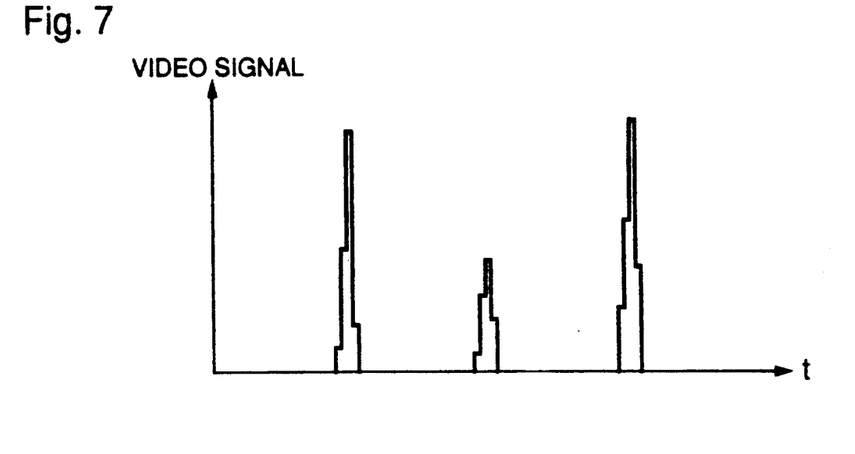
FIG. 7 is a view of video signals.

Next, a method for removing video noises from the video signals, which characterizes this embodiment will be explained with reference to FIGS. 7 to 11. When light to be measured is feeble, as shown in FIG. 7, the video signals are a train of pulse-shaped signals. In FIG. 7, each pulse signal corresponds to each photon of the light to be measured of each event sensed by the streak tube 11. The video signals contain video noises generated by the solid image detector 15 and the signal processing means 16. But the video noises have small signals compared with the above-described pulse-shaped signals. Then a threshold is set to integrate only the video signals exceeding the threshold to thereby extract only the signal components with the noises removed.

Figure 8A:
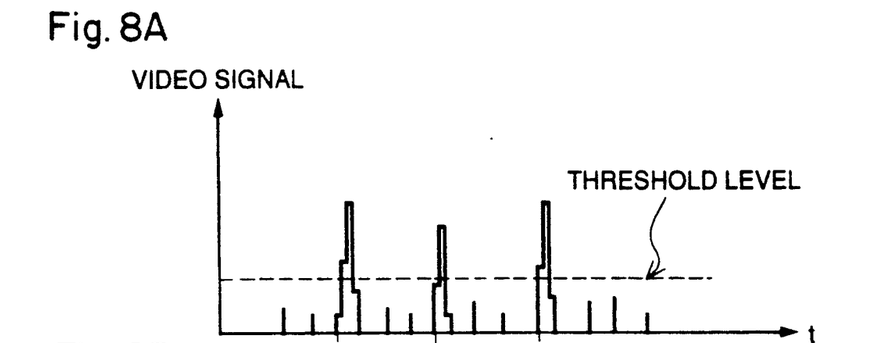
FIG. 8 is a views illustrative of a first method for removing video noises from video signals.
Figure 8B:
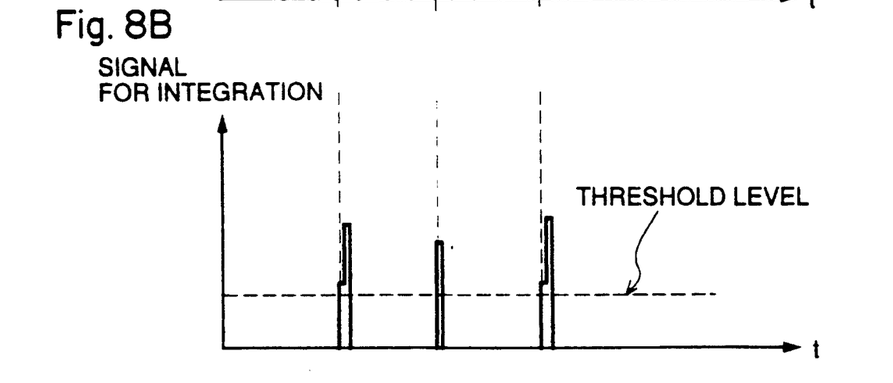
Figure 9:
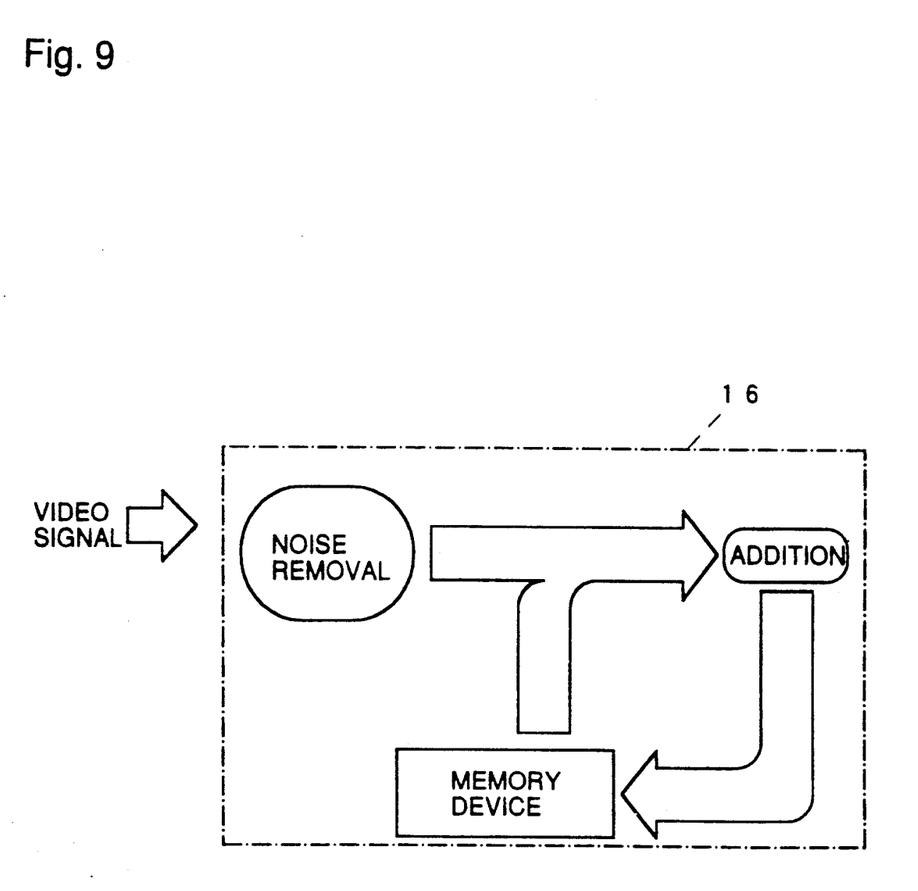
FIG. 9 is a view illustrative of a processing of the signal processing system.
Figure 10A:
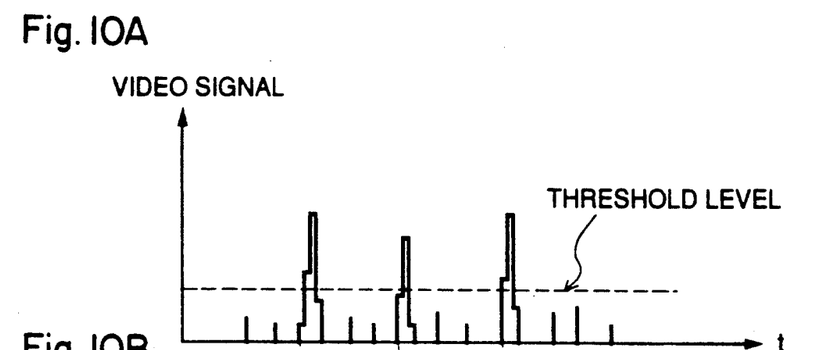
FIG. 10 is a view illustrative of a second method for removing video noises from video signals.
Figure 10B:
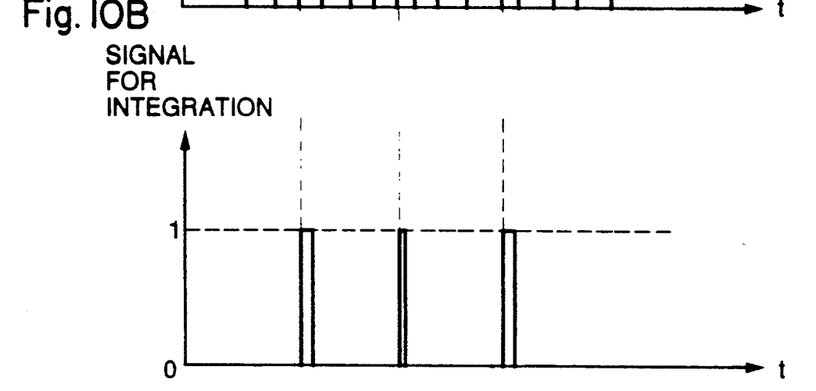
Figure 11A:
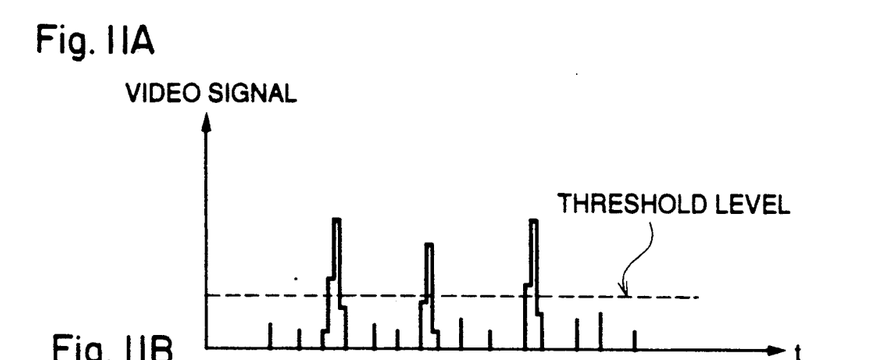
FIG. 11 is a view illustrative of a third method for removing video noises from video signals.
Figure 11B:
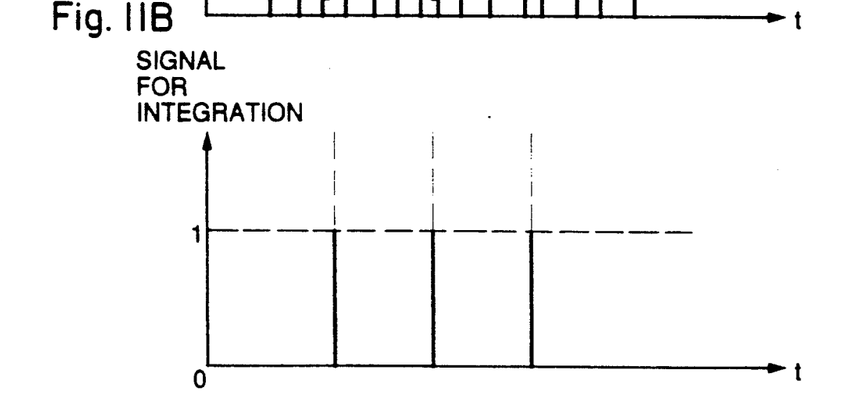

Examples of the method for the integration will be explained with reference to FIGS. 8 to 11. As shown in FIG. 8, a first method comprises integrating only signal components of video signals a above a threshold level in a memory device built in the signal processing means 16. FIG. 9 illustrates a conception of the integration in the memory device of the signal processing means 16. As shown in FIG. 9, the video signals supplied to the signal processing means 16 have noises removed to be accumulated in the memory device. Then as shown in FIG. 10, a second method comprises binarizing video signals a based on a threshold level to obtain signal components b and integrating the signal components in the memory device of the signal processing means 16. As shown in FIG. 11, a third method comprises detecting peaks b of pulse-shaped signals corresponding to the video signals a above a threshold level, and adding 1 to values of memory device associated with positions of the peaks, whereby detection times of peaks are counted.

These methods are performed on one horizontal scanning line or two-dimensionally in the case that the solid state image detector 15 is, e.g., a two-dimensional CCD. In the case that the solid state image detector 15 is linear, it is needless to say that these methods are conducted linearly.

Figure 12:
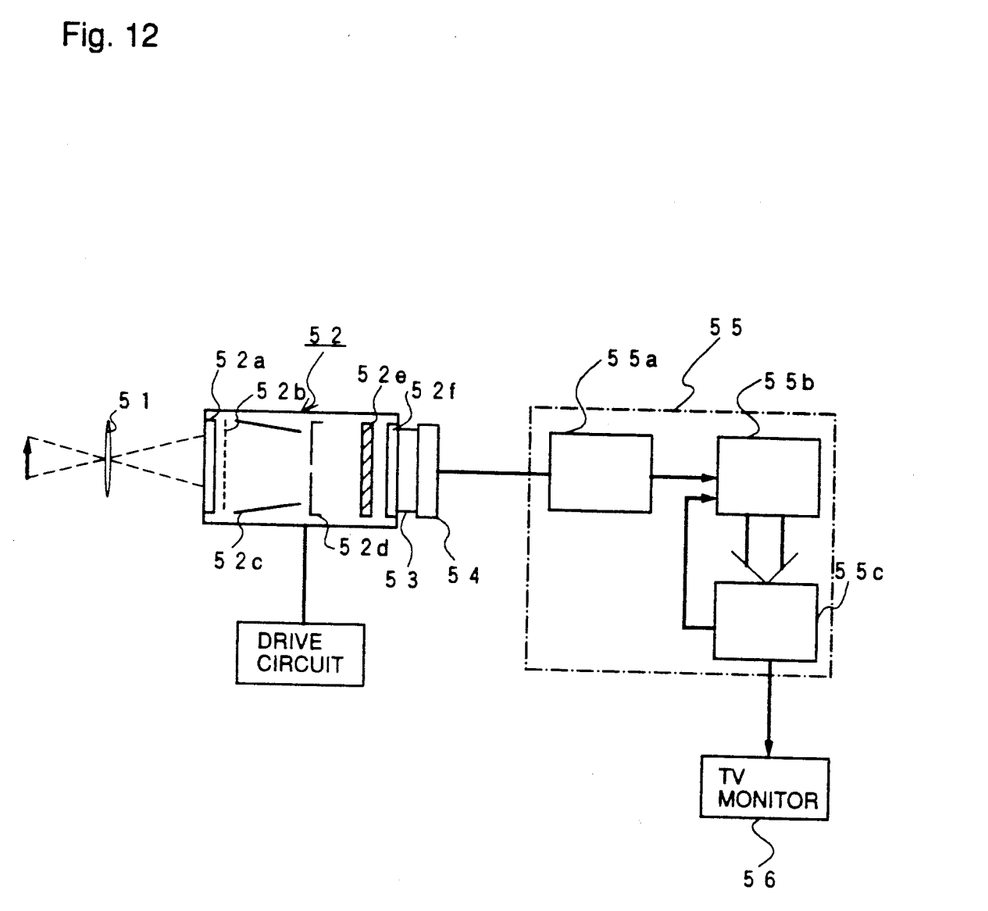
FIG. 12 is a block diagram of the feeble light imaging device according to another embodiment of this invention.

FIG. 12 shows a block diagram of the feeble light image detector according to an embodiment of this invention. An image to be measured is formed by an objective lens 51 on a photocathode 52a of an image conversion tube 52. Photoelectron corresponding to photon forming the image are emitted from the photocathode 52a. The photoelectrons are accelerated by an acceleration electrode 52b, and enter an aperture of an anode electrode 52d through a focusing electrode 52c. The photoelectrons which have passed through the aperture of the anode electrode 52d are incident on a single MCP 52e for unsaturated-type electron multiplication. The photoelectrons incident on the MCP 52e are multiplied and then are incident on a phosphor screen 52f to generate a luminous spot. The MCP 52f operates in an unsaturated state by an incidence of a single photoelectron, and accordingly the spread of a luminous spot corresponding to the incidence of the single photon is very small.

An output image of the phosphor screen 52f is guided by the fiber plate 53 to a solid state image detector 54 to be converted to electric signals there. Video signals outputted by the solid state image detector 54 are processed by a signal processing means 55 and displayed by a TV monitor 56. The signal processing means 55 includes a noise removing unit 55a comprising an amplifier, a threshold processing circuit, an A/D converter and so on. Outputs of the noise removing unit 55a are added by an adder 55 to be stored in an image memory 55c. Resultantly an image which is formed by integrating only signal components of the image to be measured with noises removed can be obtained. The processing of the video noise removal in the signal processing means 55 is the same as in FIGS. 8 to 11, and is not repeatedly explained here.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A feeble light measuring device comprising:
   photon counting means including photo-electric conversion means for generating an electron upon an incidence of light to be measured, electron multiplying means for multiplying the electron from the photo-electric conversion means, the electron multiplying means being not saturated by an incidence of one electron, and luminous means for converting the electrons multiplied by the electron multiplying means into a light image;
   image detecting means for converting the light intensity image from the photon counting means to electric outputs; and
   signal processing means for removing noise components of the electric outputs from the image detecting means to extract signal components of the electric outputs.

2. A feeble light measuring device according to claim 1, wherein the signal processing means removes noise components of the electric outputs below a set level at each event corresponding to an incidence of light to be measured upon the photo-electric conversion means, whereby the signal components are extracted.

3. A feeble light measuring device according to claim 2, wherein the signal processing means detects values of peaks of parts of the electric outputs above the set level and integrates the peak values for a set period of time, whereby the signal components are extracted.

4. A feeble light measuring device according to claim 2, wherein the signal processing means integrates parts of the electric outputs above the set level for a set period of time to extract the signal components.

5. A feeble light measuring device according to claim 2, wherein the signal processing means binarizes the electric outputs, based on the set level, and integrates the binarized outputs for a set period of time, whereby the signal components are extracted.

6. A feeble light measuring device according to claim 3, wherein the signal processing means includes memory means for storing the extracted signal components in regions thereof corresponding to respective picture elements of the luminous means, based at timing of the electric outputs from the image detecting means.

7. A feeble light measuring device according to claim 4, wherein the signal processing means includes memory means for storing the extracted signal components in regions thereof corresponding to respective picture elements of the luminous means, based at timing of the electric outputs from the image detecting means.

8. A feeble light measuring device according to claim 5, wherein the signal processing means includes memory means for storing the extracted signal components in regions thereof corresponding to respective picture elements of the luminous means, based at timing of the electric outputs from the image detecting means.

9. A feeble light measuring device according to claim 2, wherein the signal processing means detects a position of the peak of the parts of the electric outputs above the set level, based at timing of the electric outputs from the image detecting means.

10. A feeble light measuring device according to claim 9, wherein the signal processing means counts detection results of the peak positions in a set period of time for positions corresponding to respective picture elements of the luminous means.

11. A feeble light measuring device according to claim 1, wherein the electron multiplying means includes a single microchannel plate.

12. A feeble light measuring device according to claim 1, wherein the photon counting means is a streak tube, and the signal processing means gives transient changes of the light intensity to be measured, based on the extracted signal components.

13. A feeble light measuring device according to claim 1, wherein the photon counting means is a combination of a streak tube without the electron multiplying means incorporated, and an image intensifying tube with the electron multiplying means incorporated, and the signal processing means gives transient changes of the light to be measured, based on the extracted signal components.

14. A feeble light measuring device according to claim 1, wherein the photon counting means is an image intensifier tube, and the signal processing means gives a distribution image of the light to be measured, based on the extracted signal components.

15. A feeble light measuring device according to claim 1, further comprising a fiber plate for guiding to the image detecting means the light image from the luminous means included in the photon counting means.

16. A feeble light measuring device according to claim 1, wherein the image detecting means is a CCD.

17. A feeble light measuring device according to claim 1, wherein the image detecting means is a photodiode array.

* * * * *